US005322397A

United States Patent [19]

Spear

[11] Patent Number: 5,322,397

[45] Date of Patent: Jun. 21, 1994

[54] APPARATUS FOR SUPPORTING A DRILL IN AN ELEVATED POSITION

[76] Inventor: James C. Spear, 381 S. Main St., Bellingham, Mass. 02019

[21] Appl. No.: 130,849

[22] Filed: Oct. 4, 1993

[51] Int. Cl.[5] ........................ B23B 45/14; E21C 11/00

[52] U.S. Cl. ........................................ 408/99; 173/36; 269/904; 408/111; 408/136; 408/712; 414/11

[58] Field of Search .......................... 408/99, 110–112, 408/136, 712; 173/34, 36; 52/123.1, 122.1, 127.1, 127.3, DIG. 1; 269/254 R, 254 D, 254 CS, 904; 414/11

[56] References Cited

U.S. PATENT DOCUMENTS

| | | | |
|---|---|---|---|
| 2,405,110 | 8/1946 | Bullock | 77/7 |
| 3,234,977 | 2/1966 | Byers | 144/93 |
| 3,930,645 | 1/1976 | Anderson | 414/11 X |
| 4,010,943 | 3/1977 | Eft | 269/87.1 |
| 4,136,579 | 1/1979 | Robinson et al. | 74/523 |
| 4,442,905 | 4/1984 | Agoston | 173/36 |
| 4,695,028 | 9/1987 | Hunter | 414/11 X |
| 4,733,844 | 3/1988 | Molloy | 414/11 X |
| 4,736,804 | 4/1988 | Geibel | 408/99 X |

*Primary Examiner*—Steven C. Bishop

*Attorney, Agent, or Firm*—Rhodes & Ascolillo

[57] ABSTRACT

A supporting apparatus for supporting a drill in an elevated position, the drill including a drill chuck having an axis of rotation, the drill being supported by the supporting apparatus such that the axis of rotation of the drill chuck is orientated substantially vertically, the supporting apparatus including an elongated column, an actuating lever pivotally connected to the column at a pivot point and extending outward from the pivot point in two diametrically opposed directions to thereby form two lever arms, an attachment mechanism formed on a first of the two lever arms for attaching the first lever arm to a portion of the drill, a manual grip portion formed on a second of the two lever arms, a guide link pivotally connected to both the column and to the drill adjacent the drill chuck, the pivotal connection of the guide link to the column being disposed vertically above the pivot point pivotally connecting the actuating lever to the column, and an extended plate member connected to an upper portion of the column, the extended plate member extending at substantially a right angle to the axis of the column.

15 Claims, 3 Drawing Sheets

APPARATUS FOR SUPPORTING A DRILL IN AN ELEVATED POSITION

BACKGROUND

1. Field of the Invention

The present invention relates to the field of supports for hand tools, particularly portable drills.

2. Description of the Related Art

U.S. Pat. No. 4,442,905 relates to a portable jig assembly for supporting a power drill that includes a carriage mounted on a post and having a first tubular portion that surrounds the post and a second tubular portion that is positioned away from the post, the drill being attached to a rod that slides vertically within the second tubular portion, and the drill and rod being moved vertically by a lever and linkage mechanism.

U.S. Pat. No. 4,136,579 relates to a power drill attachment that forms a lever arrangement which provides a mechanical advantage in urging the bit of the drill into the workpiece.

U.S. Pat. No. 4,010,943 relates to an apparatus for supporting, guiding, and advancing a power drill into a workpiece, the apparatus including a support frame that clamps to the workpiece, a guide mechanism for guiding the advance of the drill, and a manual power screw for feeding the drill bit into the workpiece.

U.S. Pat. No. 3,234,977 relates to a power drilling device that has a generally rectangular box frame within which a drill carriage rides on rack and pinion gearing provided with respect to the sides of the rectangular frame.

U.S. Pat. No. 2,405,110 relates to an adjustable strut drill that includes a telescoping pole having a drill mounted on the top thereof and a mechanical lever arrangement for expanding the length of the telescoping pole.

SUMMARY OF THE INVENTION

Often, commercial manufacturing or other situations require the drilling of numerous holes in overhead structures. One example of such a situation is the manufacture of trailer trucks, wherein the placement of a great number of holes in the ceilings of the trailers, for the installation of a ceiling structure, may be required. Repetitive overhead drilling in this and other similar situations can place a great deal of physical strain on a worker.

Another situation that can prove physically straining is the installation of paneling (e.g., drywall, etc.) in an overhead position using a so-called "screw gun" which drives a screw through the panel and into the supporting structure. Here, the problem of applying an upward force is exacerbated by the need to have the ceiling panels supported in some manner during the installation process. If helpers are not available to support the panels, the task can become quite difficult.

Accordingly, one object of the present invention is the provision of a supporting apparatus for a power drill that supports and positions the drill in a vertical orientation near an overhead structure and thereby facilitates a repetitive overhead drilling task.

Another object of the invention is the provision of such a supporting apparatus, wherein the apparatus includes a lever actuated mechanism for advancing the drill toward and into the work surface.

Yet another object of the invention is the provision of such a supporting apparatus for a screw gun and which includes a device for adequately supporting a panel that is to be secured to an overhead surface by screws driven by the screw gun.

A still further object of the invention is the provision of such a supporting apparatus that is simple in operation and construction and, therefore, inexpensive to manufacture.

In one aspect, the invention generally features a supporting apparatus for supporting a drill in an elevated position, the drill including a drill chuck having an axis of rotation, the drill being supported by the supporting apparatus such that the axis of rotation of the drill chuck is orientated substantially vertically, the supporting apparatus including: an elongated column; an actuating lever pivotally connected to the column at a pivot point and extending outward from the pivot point in two diametrically opposed directions to thereby form two lever arms; an attachment mechanism formed on a first of the two lever arms for attaching the first lever arm to a portion of the drill; and a guide link pivotally connected to both the column and to the drill adjacent the drill chuck; the pivotal connection of the guide link to the column being disposed vertically above the pivot point pivotally connecting the actuating lever to the column.

Preferably, the supporting apparatus additionally includes a drill stop mechanism for limiting the downward extent of vertical travel of the drill; the drill stop mechanism includes a stop member protruding radially from the column substantially adjacent the pivot point of the actuating lever; the drill stop mechanism additionally includes a stepped ledge surface formed in the stop member; the attachment mechanism includes at least one elastomeric strap secured to the first lever arm; the supporting apparatus additionally includes a support mechanism for supporting a substantially planar structural member in a substantially horizontal orientation above the drill; the support mechanism includes a planar support member, the planar support member being attached to a top portion of the column, the support member being provided with at least one opening for the passage therethrough of a drill bit secured in the drill chuck of the drill; the opening includes a radially inwardly extending notch formed in the planar support member; the planar support member has a substantially rectangular shape in plan view, the substantially rectangular shape being provided with a pair of radially inwardly extending notches, one each of the pair of radially inwardly extending notches being disposed on opposite sides of the substantially rectangular shape; and the supporting apparatus additionally includes a manual grip portion formed on a second of the two lever arms.

In another aspect, the invention generally features a supporting apparatus for supporting a drill in an elevated position, the drill including a drill chuck having an axis of rotation, the drill being supported by the supporting apparatus such that the axis of rotation of the drill chuck is orientated substantially vertically, the supporting apparatus including: an elongated column; an actuating lever pivotally connected to the column at a pivot point and extending outward from the pivot point in two diametrically opposed directions to thereby form two lever arms; an attachment mechanism formed on a first of the two lever arms for attaching the first lever arm to a portion of the drill; a manual grip portion formed on a second of the two lever arms; a guide link pivotally connected to both the column and to the drill adjacent the drill chuck; the pivotal connection of the guide link to the column being disposed vertically above the pivot point pivotally connecting the actuating lever to the column; and an extended plate member connected to an upper portion of the column; the extended plate member extending at substantially a right angle to the axis of the column.

Preferably, the supporting apparatus additionally includes a drill stop member protruding radially from the column substantially adjacent the pivot point of the actuating lever; the supporting apparatus additionally includes a stepped ledge surface formed in the drill stop member; and the attachment mechanism includes at least one elastomeric strap secured to the first lever arm.

In yet another aspect, the invention generally features a supporting apparatus for supporting a drill in an elevated position, the drill including a drill chuck having an axis of rotation, the drill being supported by the supporting apparatus such that the axis of rotation of the drill chuck is orientated substantially vertically, the supporting apparatus including: first and second elongated column sections having substantially coaxial longitudinal axes; an extension mechanism for urging the first and second column sections away from one another along the substantially coaxial longitudinal axes; an actuating lever pivotally connected to the first column section at a pivot point and extending outward from the pivot point in two diametrically opposed directions to thereby form two lever arms; an attachment mechanism formed on a first of the two lever arms for attaching the first lever arm to a portion of the drill; the attachment mechanism including at least one elastomeric strap secured to the first lever arm; a manual grip portion formed on a second of the two lever arms; a guide link pivotally connected to both the first column section and to the drill adjacent the drill chuck; the pivotal connection of the guide link to the first column section being disposed vertically above the pivot point pivotally connecting the actuating lever to the first column section; a drill stop member protruding radially from the column substantially adjacent the pivot point of the actuating lever; a stepped ledge surface formed in the drill stop member; and an extended plate member connected to an upper portion of the first column section; the extended plate member extending at substantially a right angle to the axis of the first column section.

The invention will now be described by way of a particularly preferred embodiment, reference being made to the accompanying drawings, wherein:

DESCRIPTION OF THE PREFERRED EMBODIMENT

Figure 1:
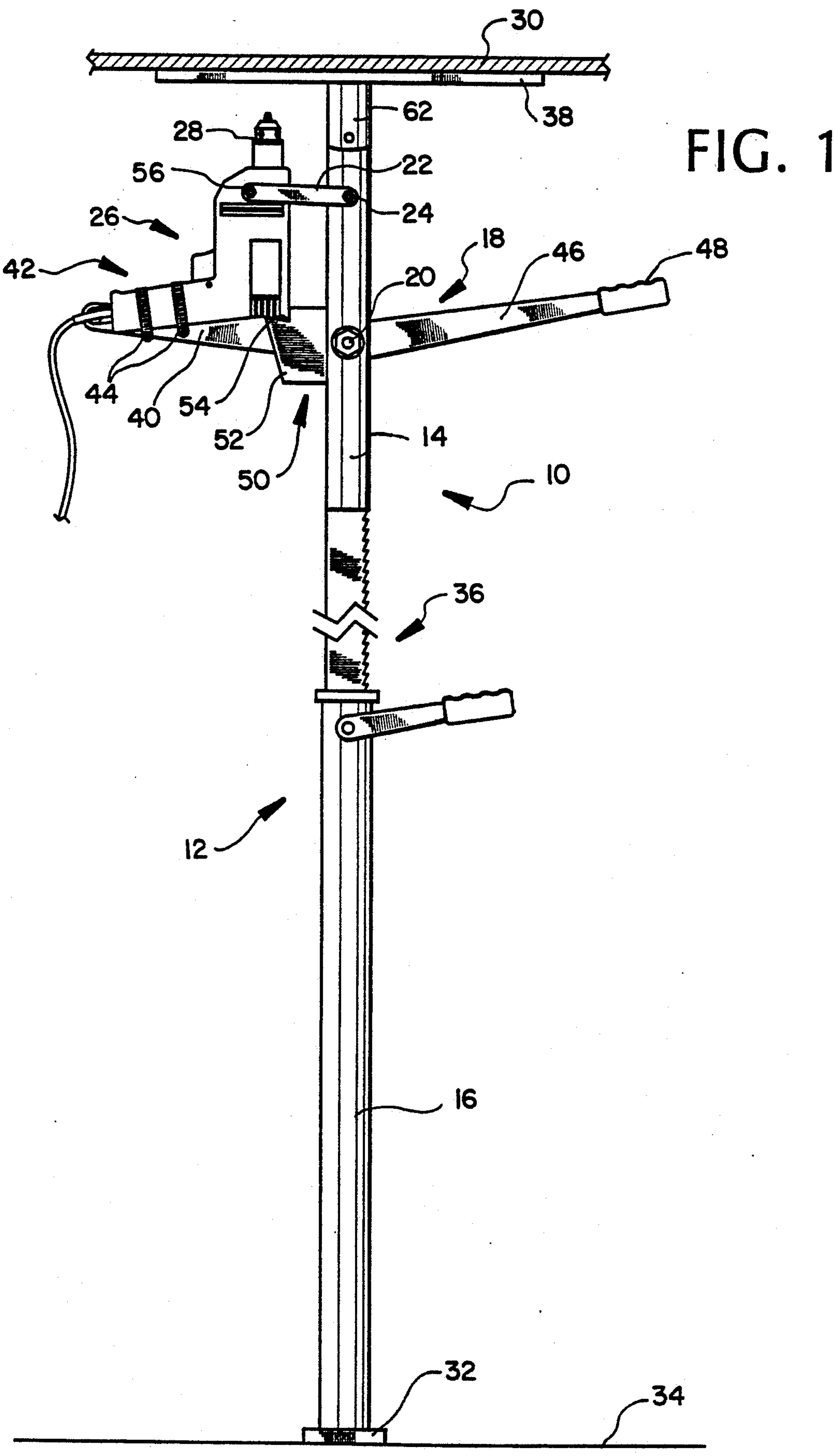
FIG. 1 is an elevational view of a supporting apparatus for a drill constructed according to the present invention.

Referring initially now to FIG. 1, an apparatus 10 for supporting a drill in an elevated and inverted position constructed according to the invention generally includes a column 12, the column 12 being made up of a pair of column sections, an upper column section 14 and a lower column section 16, an actuating lever 18 that is pivotally connected to the upper column section 14 at a pivot point 20 (preferably located at approximately the midpoint of the upper column section 14), and a guide link 22, which is also pivotally connected to the upper column section 14 at another pivot point 24 located vertically above the pivot point 20.

The supporting apparatus 10 is particularly designed and adapted for supporting a drill 26 (for example, a portable drill) having a drill chuck 28 in such a position that the axis of rotation of the drill chuck 28 is oriented in a substantially vertical position, whereby the drill 26 may be conveniently, and with relatively little effort, employed to drill holes in an overhead structure 30. The lower column section 16 is preferably provided with a radially extending foot portion 32, preferably fabricated from a non-skid rubber material, that rests on a floor or ground level 34, and an extension or jacking mechanism 36 is provided between the upper and lower column sections 14 and 16 for urging the upper and lower column sections 14 and 16 apart from one another along their common longitudinal axis such that the column 12 can be adjusted to various heights to facilitate the drilling of holes in different height ceilings and/or to allow the column 12 to be wedged between the floor level 34 and the overhead structure 30. The extension or jacking mechanism 36 is one of any one of a number of such mechanisms that are well known in the mechanical arts. Preferably, the extension or jacking mechanism 36 is of the well known rachet and pawl type of mechanism that is commonly employed in motor vehicle bumper type jacks.

Figure 2:
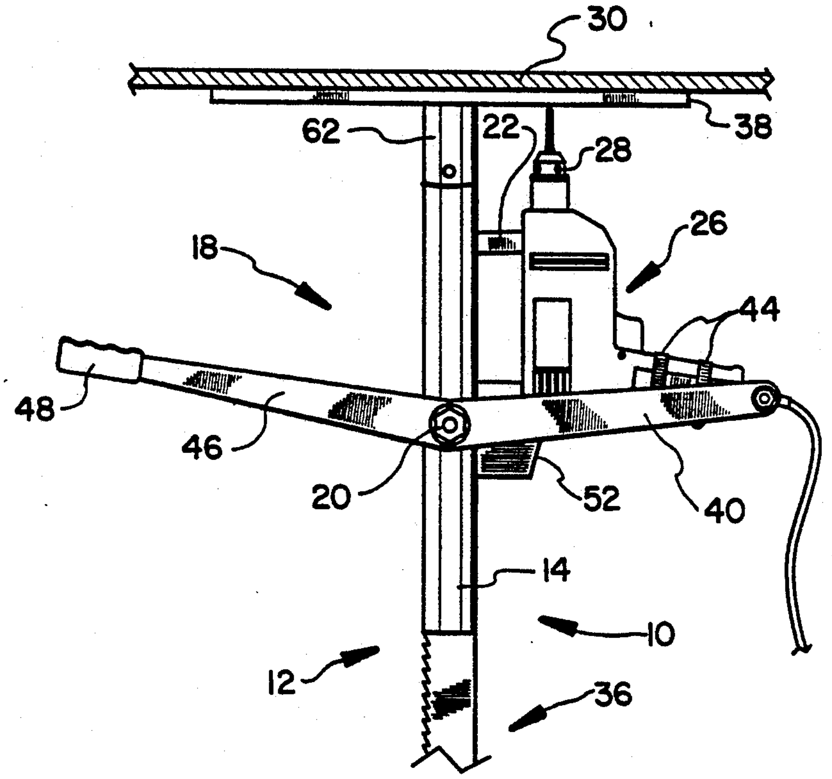
FIG. 2 is an elevational view of an upper portion of the inventive supporting apparatus, showing the drill in a downward retracted position.
Figure 3:
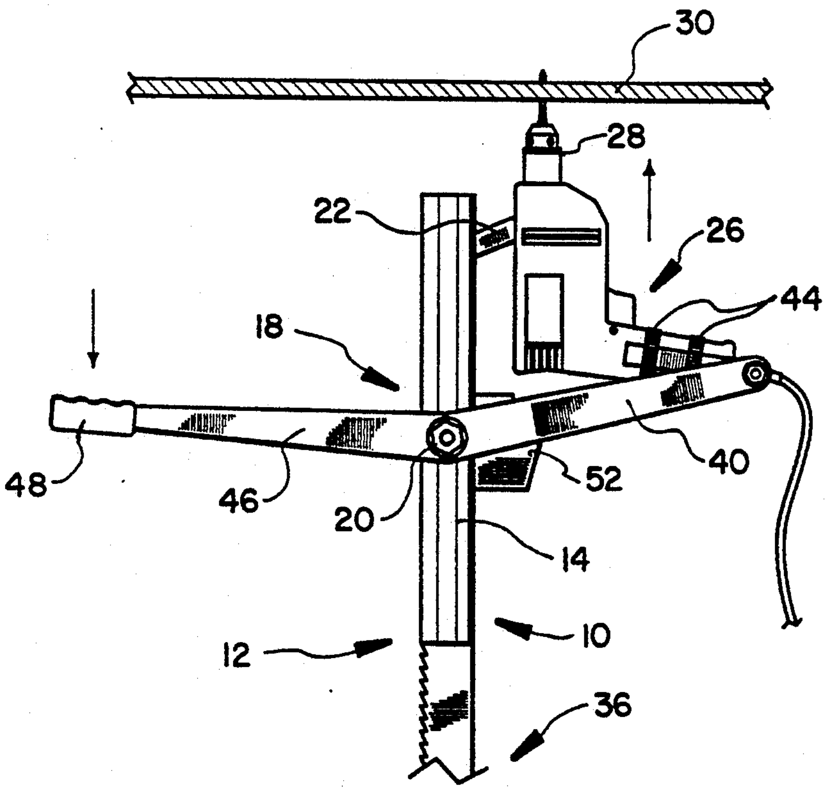
FIG. 3 is another elevational view of an upper portion of the inventive supporting apparatus, showing the drill in an upward extended position.

The supporting apparatus 10 may optionally be fitted with a planar support member 38 located at the top of the upper column section 14, as shown in FIGS. 1 and 2, the planar support member 38 being shown in detail in FIG. 4 and described more fully below, or the supporting apparatus 10 may be used without the planar support member 38, as is shown in FIG. 3. The optional planar support member 38 allows the supporting apparatus 10 to be quite rigidly positioned between the floor level 34 and the overhead structure 30, as is seen in FIG. 1. However, without the optional planar support member 38, the supporting apparatus 10 can be more easily repositioned (for example, when drilling repeated holes for the installation of a ceiling structure), as is seen in FIG. 3.

The actuating lever 18 forms two lever arms located on opposite sides of the pivot point 20. A first of the lever arms 40 is provided with an attachment mechanism 42 for attachment to a portion of the drill 26, preferably for attachment to a handle portion of the drill 26. Preferably, the attachment mechanism 42 includes a pair of straps 44 for encircling the handle portion of the drill 26. The straps 44 are preferably constructed from an elastomeric material that provides some give, thereby allowing the handle of the drill 26 to swing a short distance angularly away from the first lever arm 40, as seen in FIG. 3. The straps 44 may be constructed in the form of completely closed loops or may be closable by any one of a number of closure mechanisms well known in the art. A second of the lever arms 46 is provided with a manual grip portion 48 formed thereon, preferably a slip-on elastomeric type grip.

A drill stop mechanism 50 projects from the upper column section 14 approximately adjacent the pivot point 20 and limits the downward extent of travel of the drill 26. The drill stop mechanism 50 is preferably in the form of a stop member 52 having a stepped ledge surface 54 formed on the radially outward and upward portion thereof, the stepped ledge surface 54 preferably being dimensioned to engage an angular rear portion of the drill 26.

The guide link 22, one end of which is pivotally connected at the pivot point 24 to the upper column section 14, has another end that pivotally connects to the drill 26 at yet another pivot point 56 located substantially adjacent the drill chuck 28, and preferably a short distance radially outward of the axis of rotation of the drill chuck 28. The guide link 22 functions to maintain the drill in a substantially vertical orientation such that the axis of the drill chuck 28 is kept substantially vertical. While there will be some angular displacement of the axis of rotation of the drill chuck 28 between the lowermost and uppermost positions, as is seen by a comparison of FIGS. 2 and 3, the angular displacement will be minimal and, in most situations encountered, acceptable, particularly in view of the simplicity of construction of the supporting apparatus 10.

Figure 4:
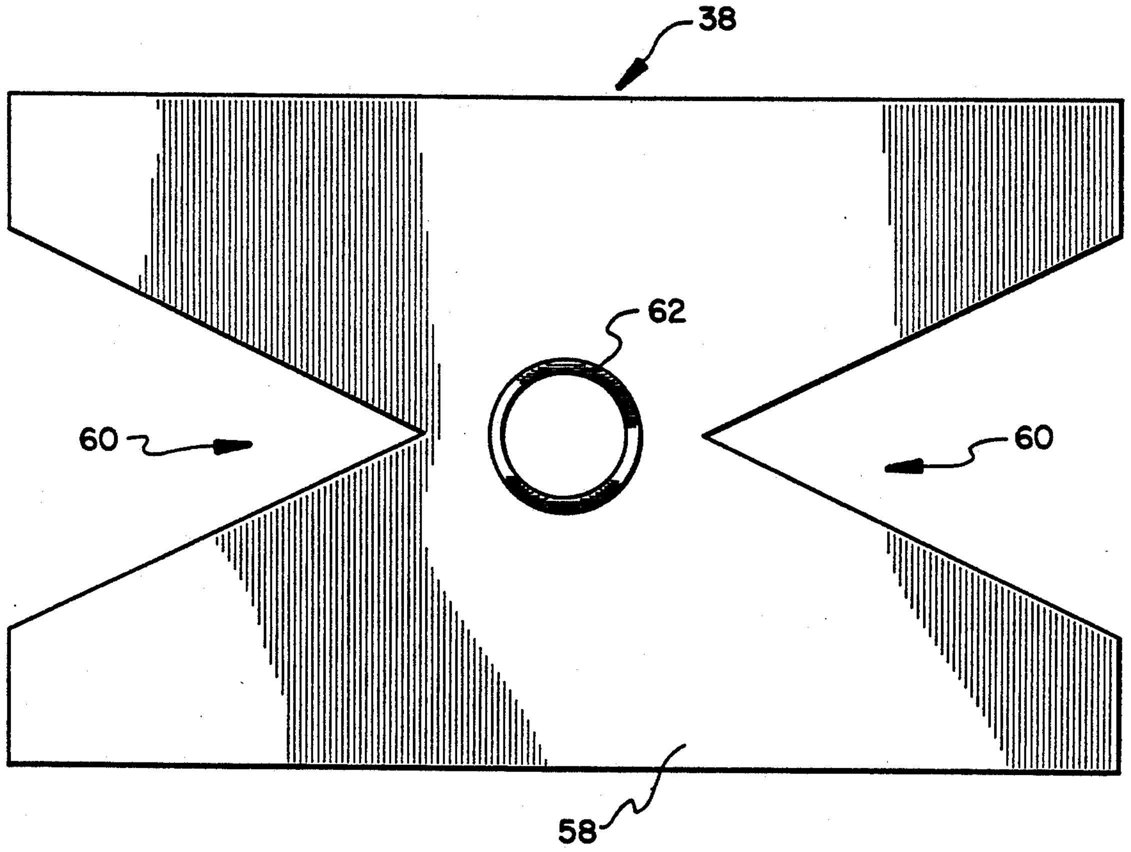
FIG. 4 is a plan view of a planar support member that may be provided at the top of the supporting apparatus.

The planar support member 38 is shown in detail in FIG. 4 and includes an extended substantially flat plate member 58 that is substantially rectangular in outline, when viewed in plan, the plate member 58 having at least one, and preferably two, radially extending V-shaped notches (or cutouts) 60 which project inward from opposite sides of the general rectangular shape of the plate member 58. The notches 60 provide clearance for passage of a drill bit secured in the drill chuck 28 into the overhead structure 30. The planar support member 38 additionally includes a short tubular section 62 that projects outward from the plate member 58 and that is dimensioned to slip over the upper column section 14, as seen in FIGS. 1 and 2. When so positioned, the planar support member 38 may be used to support a ceiling panel, or any other similar object, in place while the object is being secured with driven screws to the overhead structure 30.

While the invention has been herein described by way of a particular preferred embodiment, various substitutions of equivalents may be effected without departing from the spirit and scope of the invention as set forth in the following claims.

What is claimed is:

1. A supporting apparatus for supporting a drill in an elevated position, the drill including a drill chuck having an axis of rotation, the drill being supported by said supporting apparatus such that the axis of rotation of the drill chuck is orientated substantially vertically, said supporting apparatus comprising:
- an elongated column;
- an actuating lever pivotally connected to said column at a pivot point and extending outward from said pivot point in two diametrically opposed directions to thereby form two lever arms;
- attachment means formed on a first of said two lever arms for attaching said first lever arm to a portion of the drill; and
- a guide link pivotally connected to both said column and to the drill adjacent the drill chuck;
- said pivotal connection of said guide link to said column being disposed vertically above said pivot point pivotally connecting said actuating lever to said column.

2. A supporting apparatus according to claim 1, wherein said supporting apparatus additionally comprises drill stop means for limiting the downward extent of vertical travel of the drill.

3. A supporting apparatus according to claim 2, wherein said drill stop means comprises a stop member protruding radially from said column substantially adjacent said pivot point of said actuating lever.

4. A supporting apparatus according to claim 3, wherein said drill stop means additionally comprises a stepped ledge surface formed in said stop member.

5. A supporting apparatus according to claim 4, wherein said attachment means comprises at least one elastomeric strap secured to said first lever arm.

6. A supporting apparatus according to claim 5, wherein said supporting apparatus additionally comprises support means for supporting a substantially planar structural member in a substantially horizontal orientation above the drill.

7. A supporting apparatus according to claim 6, wherein said support means comprises a planar support member, said planar support member being attached to a top portion of said column, said support member being provided with at least one opening for the passage therethrough of a drill bit secured in the drill chuck of the drill.

8. A supporting apparatus according to claim 7, wherein said opening comprises a radially inwardly extending notch formed in said planar support member.

9. A supporting apparatus according to claim 8, wherein said planar support member has a substantially rectangular shape in plan view, said substantially rectangular shape being provided with a pair of radially inwardly extending notches, one each of said pair of radially inwardly extending notches being disposed on opposite sides of said substantially rectangular shape.

10. A supporting apparatus according to claim 9, wherein said supporting apparatus additionally comprises a manual grip portion formed on a second of said two lever arms.

11. A supporting apparatus for supporting a drill in an elevated position, the drill including a drill chuck having an axis of rotation, the drill being supported by said supporting apparatus such that the axis of rotation of the drill chuck is orientated substantially vertically, said supporting apparatus comprising:
- an elongated column;
- an actuating lever pivotally connected to said column at a pivot point and extending outward from said pivot point in two diametrically opposed directions to thereby form two lever arms;
- attachment means formed on a first of said two lever arms for attaching said first lever arm to a portion of the drill;
- a manual grip portion formed on a second of said two lever arms;
- a guide link pivotally connected to both said column and to the drill adjacent the drill chuck;
- said pivotal connection of said guide link to said column being disposed vertically above said pivot point pivotally connecting said actuating lever to said column; and
- an extended plate member connected to an upper portion of said column;
- said extended plate member extending at substantially a right angle to said axis of said column.

12. A supporting apparatus according to claim 11, wherein said supporting apparatus additionally comprises a drill stop member protruding radially from said column substantially adjacent said pivot point of said actuating lever.

13. A supporting apparatus according to claim 12, wherein said supporting apparatus additionally comprises a stepped ledge surface formed in said drill stop member.

14. A supporting apparatus according to claim 13, wherein said attachment means comprises at least one elastomeric strap secured to said first lever arm.

15. A supporting apparatus for supporting a drill in an elevated position, the drill including a drill chuck having an axis of rotation, the drill being supported by said supporting apparatus such that the axis of rotation of the drill chuck is orientated substantially vertically, said supporting apparatus comprising:

first and second elongated column sections having substantially coaxial longitudinal axes;

extension means for urging said first and second column sections away from one another along said substantially coaxial longitudinal axes;

an actuating lever pivotally connected to said first column section at a pivot point and extending outward from said pivot point in two diametrically opposed directions to thereby form two lever arms;

attachment means formed on a first of said two lever arms for attaching said first lever arm to a portion of the drill;

said attachment means comprising at least one elastomeric strap secured to said first lever arm;

a manual grip portion formed on a second of said two lever arms;

a guide link pivotally connected to both said first column section and to the drill adjacent the drill chuck;

said pivotal connection of said guide link to said first column section being disposed vertically above said pivot point pivotally connecting said actuating lever to said first column section;

a drill stop member protruding radially from said column substantially adjacent said pivot point of said actuating lever;

a stepped ledge surface formed in said drill stop member; and an extended plate member connected to an upper portion of said first column section;

said extended plate member extending at substantially a right angle to said axis of said first column section.

* * * * *